June 14, 1938.  W. S. DIEHL  2,120,242

AUTOMATIC CUT-OFF VALVE

Filed Aug. 12, 1936

INVENTOR
WALTER S. DIEHL
BY
ATTORNEY

Patented June 14, 1938

2,120,242

UNITED STATES PATENT OFFICE 2,120,242

AUTOMATIC CUT-OFF VALVE

Walter S. Diehl, United States Navy

Application August 12, 1936, Serial No. 95,570

3 Claims. (Cl. 137—153)

(Granted under the act of March 3, 1883, as amended April 30, 1928; 370 O. G. 757)

This invention relates to improvements in automatic cut-off valves to prevent the loss of the fluid under pressure, in the event of a rupture in the system.

An important object of this invention is to provide an automatic cut-off valve, in a system supplying fluid under pressure, which may be regulated so as to automatically close should the piping on the discharge side of the valve become broken, or suffer any casualty which would result in a loss of the fluid.

A further object of the invention is to provide a means for rearming or resetting the valve when the operator desires to again put the fluid system into commission.

Other objects and advantages of the invention will be apparent during the course of the following description.

In the drawing, forming a part of this specification, and in which like numerals are employed to designate like parts throughout the same, Fig. 1 is a cut-away side elevation of the assembled valve;

Figure 1:
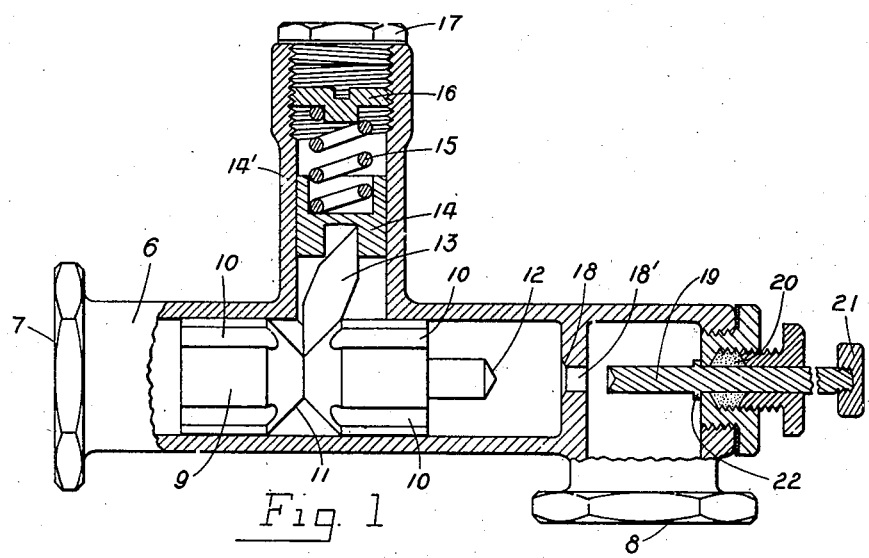

In the drawing, wherein for the purpose of illustration, is shown a preferred embodiment of my invention, the number 6 designates the metal valve body with a flanged inlet opening 7 and flanged outlet opening 8.

Contained within the valve body is a plunger 9 provided with longitudinal grooves or slots 10, an annular groove 11, and a valve member 12.

Resting within the annular groove 11 is a toggle 13, which toggle is securely held in place by a grooved plunger 14, which is slidably mounted in a cylindrical boss 14' formed integrally with the valve body 6. A plunger spring 15 is also disposed within the boss 14' between the plunger 14 and an adjusting nut 16, which is threaded into the upper end of the boss 14'. The upper end of the boss 14' is closed by a cap screw 17.

The valve member 12 is machined to seat on a valve seat 18 surrounding an opening 18'. A reseating spindle 19 is manually operable through a stuffing box 20 by a knob 21 for the purpose of rearming the valve member 12. A raised shoulder 22 prevents the spindle 19 from being withdrawn from the stuffing box 20.

Figures 2, 3:
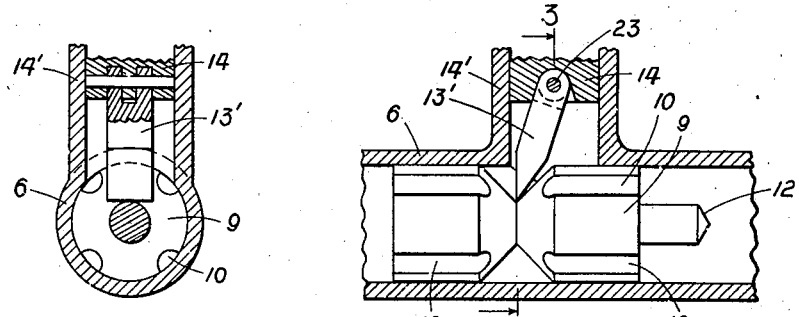
Fig. 2 is a modification of the plunger with a pivoted toggle rather than a sliding toggle.
Fig. 3 is a section on the line 3—3 of Fig. 2.

Fig. 2 shows a toggle 13' attached to the plunger 14 by a pivot 23.

Figure 4:
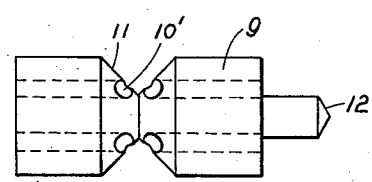
Fig. 4 is a side elevation of the valve plunger showing it drilled with several longitudinal holes rather than longitudinal slots or grooves.
Figure 5:
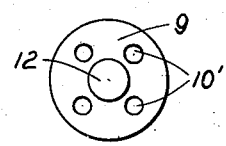
Fig. 5 is an end elevation of Fig. 4.

Fig. 4 and Fig. 5 show the longitudinal slots or grooves 10 in the plunger 9 replaced by longitudinal holes 10'.

The operation of the automatic cut-off valve is as follows:

Before putting the valve 6 into operation the plunger spring 15 is set at a predetermined tension by means of adjusting nut 16 so that the toggle 13 will maintain the plunger 9 in its normal position, as shown in Fig. 1. The valve is armed or cocked by pushing spindle 19 into engagement with valve face 12 and continuing this movement until the plunger 9 is returned to its normal position. With the valve 6 so armed, the fluid under pressure flows into the valve 6, the inlet 7, thence through the longitudinal slots, grooves or holes 10 of plunger 9 and through the valve opening 18, and thence through outlet 8. Should any rupture take place in the system on the outlet side of the automatic cut-out valve the pressure on this side of the valve body 6 will immediately drop to zero, as will the pressure on the downstream side of the plunger 9. The pressure which is acting on the upstream face of plunger 9 will be exerted on it and will overcome the pressure exerted on the plunger 9 by the toggle 13 and will cause the plunger 9 to travel along the cylinder of the valve body 6 and force the valve member 12 into engagement with the valve seat 18, thus sealing it to prevent any further flow of the fluid through the outlet 8. The size of the valve body 6 and plunger 9 depends upon the pressure drop required to trip toggle 13. The size of the toggle 13 depends upon the tripping load differential, which is dependent on the maximum rate of normal flow through the valve body 6, and the viscosity of the fluid. An approximate size may readily be calculated from the equations of hydrodynamics, and the exact relations may be found by adjusting the tripping load on the toggle spring.

It is understood that the form of my invention, herewith shown and described, is to be taken as a preferred example of same, and the various changes in the shape, size and arrangement of parts may be resorted to without departing from the spirit of my invention, or the scope of the subjoined claims.

The invention described herein may be manufactured and used by or for the Government of the United States of America for governmental purposes without the payment of any royalties thereon or therefor.

Having thus set forth and disclosed the nature of this invention, what is claimed is:

1. A valve operated by differential fluid pressure comprising a cylindrical fluid passage with an orifice in the downstream end, a grooved piston slidably fitted in said cylindrical passage and carrying a needle device on its downstream end, said needle device coaxially registering with said downstream orifice a toggle device for holding said piston and appendage selectively away from or against said orifice, and a rearming device for setting said piston in a valve-open position against the toggle action tending to keep said piston in a valve-closed position.

2. A valve operated by differential fluid pressure comprising a cylindrical fluid passage with an orifice in the downstream end, a perforated piston slidably fitted in said cylindrical passage and carrying a needle device on its downstream end, said needle device coaxially registering with said downstream orifice, a toggle device for holding said piston and appendage selectively away from or against said orifice, and a rearming device for setting said piston in a valve-open position against the toggle action tending to keep said piston in a valve-open position against the toggle action tending to keep said piston in a valve-closed position.

3. A valve operated by differential pressure comprising a cylindrical fluid passage with scored walls and an orifice in the downstream end, a piston slidably fitted in said cylindrical passage and carrying a needle device on its downstream end, said needle device coaxially registering with said downstream orifice, a toggle device for holding said piston and appendage selectively away from or against said orifice, and a rearming device for setting said piston in a valve-open position against the toggle action tending to keep said piston in a valve-closed position.

WALTER S. DIEHL.